(12) United States Patent
Celestini

(10) Patent No.: US 11,734,836 B2
(45) Date of Patent: Aug. 22, 2023

(54) VIDEO-BASED SYSTEMS AND METHODS FOR GENERATING COMPLIANCE-ANNOTATED MOTION TRAILS IN A VIDEO SEQUENCE FOR ASSESSING RULE COMPLIANCE FOR MOVING OBJECTS

(71) Applicant: Stefano Celestini, Oakville (CA)

(72) Inventor: Stefano Celestini, Oakville (CA)

(73) Assignee: Pacefactory Inc., Oakville (CA)

(*) Notice: Subject to any disclaimer, the term of this patent is extended or adjusted under 35 U.S.C. 154(b) by 191 days.

(21) Appl. No.: 17/157,955

(22) Filed: Jan. 25, 2021

(65) Prior Publication Data

US 2021/0233255 A1 Jul. 29, 2021

Related U.S. Application Data

(60) Provisional application No. 62/966,512, filed on Jan. 27, 2020.

(51) Int. Cl.
| | |
|---|---|
| *G06T 7/246* | (2017.01) |
| *G06T 7/292* | (2017.01) |
| *G06V 20/40* | (2022.01) |
| *G06V 20/52* | (2022.01) |
| *G06F 18/243* | (2023.01) |

(52) U.S. Cl.
CPC ........ *G06T 7/246* (2017.01); *G06F 18/24317* (2023.01); *G06T 7/292* (2017.01); *G06V 20/41* (2022.01); *G06V 20/52* (2022.01); *G06V 20/44* (2022.01)

(58) Field of Classification Search
CPC ........ G06V 20/52; G06V 20/41; G06V 20/44; G06T 7/292; G06T 7/246; G06T 2207/30241; G06T 2207/30232; G06T 2207/30196; G06F 18/24317
See application file for complete search history.

(56) References Cited

U.S. PATENT DOCUMENTS

| | | | |
|---|---|---|---|
| 2015/0286865 A1 | 10/2015 | McCoy et al. | |
| 2019/0041216 A1* | 2/2019 | Chin | G06F 3/04815 |
| 2019/0266414 A1* | 8/2019 | Stawiszynski | G06Q 50/26 |

FOREIGN PATENT DOCUMENTS

| | | |
|---|---|---|
| AU | 2010257454 | 7/2012 |
| RU | 2531876 | 10/2014 |

* cited by examiner

*Primary Examiner* — Kenny A Cese
(74) *Attorney, Agent, or Firm* — CRGO Global; Steven M. Greenberg

(57) ABSTRACT

The present disclosure uses automated, computer-driven analysis of video feeds to extract raw motion metadata, identify moving objects and assess whether or not the moving objects are compliant with certain predefined rules. The motion can be visually plotted on a background in the form of motion trails, and a chronological plot of the motion may be provided as a menu to find anomalies through visual screening. The motion metadata may be filtered through annotations. A highlighted portion of the video feed relating to a specific topic of interest may be replayed.

15 Claims, 7 Drawing Sheets

75% Non-Compliant, 25% Compliant through danger zone

75% Non-Compliant, 25% Compliant through danger zone

VIDEO-BASED SYSTEMS AND METHODS FOR GENERATING COMPLIANCE-ANNOTATED MOTION TRAILS IN A VIDEO SEQUENCE FOR ASSESSING RULE COMPLIANCE FOR MOVING OBJECTS

CROSS-REFERENCE TO RELATED APPLICATION

This application claims priority to Canadian Patent Application No. 3,103,768, filed Dec. 21, 2020 and U.S. Provisional Application No. 62/966,512 filed on Jan. 27, 2020, the teachings of both which are hereby incorporated by reference.

TECHNICAL FIELD

The present disclosure relates to automated computer-driven analytics for video surveillance.

BACKGROUND

With video surveillance or monitoring, the typical purpose is to capture an event and use this information to visually identify an individual doing something that they should not be doing (e.g. a violation of law, organizational policy or safety rules).

Some such imagery may be used for coaching and training rather than for discipline, by providing examples to illustrate a topic using informative annotations that are relevant to the teaching. For example, imagery showing a safety violation and/or imagery showing proper safety procedures may be used as part of a safety training program.

Manual review of video surveillance imagery to identify non-compliant behaviour is time-consuming, tedious and error-prone. While some automated video analytic tools exist, they are susceptible of improvement in enabling identification and review of anomalies by a human reviewer.

SUMMARY

The present disclosure uses automated, computer-driven analysis of video feeds to extract raw motion metadata, identify moving objects and assess whether or not the moving objects are compliant with certain predefined rules. The motion can be visually plotted on a background in the form of motion trails, and a chronological plot of the motion may be provided as a menu to find anomalies through visual screening. The motion metadata may be filtered through annotations. A highlighted portion of the video feed relating to a specific topic of interest may be replayed.

In one aspect, a method for generating compliance-annotated motion trails in a video sequence from a fixed scene comprises receiving a video sequence for the scene, identifying moving objects within the video sequence, classifying the identified moving objects as being one of compliant moving objects and non-compliant moving objects, applying non-compliance annotations to designate the non-compliant moving objects as being non-compliant, further using the non-compliance annotations to associate those portions of the video sequence in which the non-compliant moving objects appear with respective ones of the non-compliant moving objects, generating non-compliant motion trails for the non-compliant moving objects, wherein each non-compliant motion trail is associated with a specific one of the non-compliant moving objects, displaying the non-compliant motion trails as a static overlay on the scene, receiving a selection of a selected one of the non-compliant motion trails, and, responsive to the selection of a selected one of the non-compliant motion trails, replaying the specific portion of the video sequence in which the non-compliant moving object associated with the selected one of the non-compliant motion trails appears.

The method may further comprise applying compliance annotations to designate the compliant moving objects as being compliant, further using the compliance annotations to associate those portions of the video sequence in which the compliant moving objects appear with respective ones of the compliant moving objects, generating compliant motion trails for the compliant moving objects, wherein each compliant motion trail is associated with a specific one of the compliant moving objects, displaying the compliant motion trails as part of the static overlay on the scene, receiving a selection of a selected one of the compliant motion trails, and responsive to the selection of a selected one of the compliant motion trails, replaying the specific portion of the video sequence in which the compliant moving object associated with the selected one of the compliant motion trails appears. Preferably, the compliant motion trails are visually distinguished from the non-compliant motion trails within the static overlay.

In some embodiments, the static overlay further comprises a timeline bar corresponding to a timeline of the video sequence, and highlighting a selected one of the non-compliant motion trails results in highlighting a portion of the timeline bar corresponding to the specific portion of the video sequence in which the non-compliant moving object associated with the highlighted one of the non-compliant motion trails appears.

In some embodiments, the static overlay further comprises a timeline bar corresponding to a timeline of the video sequence, highlighting a selected one of the non-compliant motion trails results in highlighting a portion of the timeline bar corresponding to the specific portion of the video sequence in which the non-compliant moving object associated with the highlighted one of the non-compliant motion trails appears, and highlighting a selected one of the compliant motion trails results in highlighting a portion of the timeline bar corresponding to the specific portion of the video sequence in which the compliant moving object associated with the highlighted one of the compliant motion trails appears.

In some embodiments, the non-compliant moving object associated with the selected one of the non-compliant motion trails is visually annotated in the specific portion of the video sequence in which the non-compliant moving object associated with the selected one of the non-compliant motion trails appears.

In another aspect, a method for generating compliance-annotated motion trails for a scene comprises receiving a video sequence for the scene, the video sequence comprising a series of image frames capturing the scene, identifying moving objects within the video sequence, identifying time-stamped frame-to-frame vector sequences representing movement of the identified moving objects within the scene, wherein each identified moving object has its own vector sequence, classifying the identified moving objects into categories, wherein the categories include at least human beings and non-human objects, applying classification-based compliance rules to the respective vector sequences for each of the classified identified moving objects to determine non-compliant portions of the vector sequences and compliant portions of the vector sequences, and presenting an image of the scene with at least one visible motion trail corresponding to a respective vector sequence for a respective particular one of the classified identified moving objects overlaid on the image.

The method may further comprise preprocessing the video sequence before identifying moving objects within the video sequence.

In some embodiments, identifying time-stamped frame-to-frame vector sequences representing movement of the identified moving objects within the scene comprises, for each identified moving object, assigning a unique identifier to that moving object and associating a time-series of movement vectors for that moving object with the unique identifier for that moving object.

The method may further comprise storing a subset of image frames from the video sequence for the scene, wherein the subset has a subset image frame frequency that is less than a sequence image frame frequency for the video sequence.

In some embodiments, the category of non-human objects includes subcategories comprising two or more of the following: fixed machine with moving parts; vehicle; and transported object, and classifying the identified moving objects into categories comprises classifying the non-human objects into the subcategories. In certain particular embodiments, the subcategory of vehicle includes at least two of forklift, golf cart, autonomous vehicle, automated guide vehicle, tugger, car, bicycle, van, dump truck, excavator, mining shovel, loader, flatbed truck, tractor, tractor trailer, standing lift truck, powered industrial vehicle, powered pallet jacks, boom truck, and scissor lift.

The classification-based compliance rules may include one or more of: boundary-based rules; speed-based rules; proximity-based rules; combination-based rules; and sequence-based rules.

In some embodiments, presenting an image of the scene with at least one visible motion trail corresponding to a respective vector sequence for a respective particular one of the classified identified moving objects overlaid on the image comprises presenting visible motion trails for the respective vector sequences for respective particular ones of a plurality of the classified identified moving objects overlaid on the image. In certain particular embodiments, the plurality of the classified identified moving objects is one of: all of the classified identified moving objects; all of the compliant classified identified moving objects; all of the non-compliant classified identified moving objects; all of the compliant classified identified moving objects of one specific category or subcategory; and all of the non-compliant classified identified moving objects of one specific category or subcategory.

In some embodiments, presenting an image of the scene with at least one visible motion trail corresponding to a respective vector sequence for a respective particular one of the classified identified moving objects overlaid on the image is in response to a selection.

The visible motion trails may be overlaid on the image for all of the classified identified moving objects, or for a subset of the classified identified moving objects.

In some embodiments, the at least one visible motion trail represents one of the non-compliant portion of the vector sequence, the compliant portion of the vector sequence, the complete vector sequence and an arbitrary portion of the vector sequence.

In some embodiments, the visible motion trail corresponding to a respective vector sequence for a respective particular one of the classified identified moving objects that is classified as an idle object comprises a static indication of the idle object. The static indication of the idle object may be one of an image of the idle object, a heat map, and a fixed marking.

In some embodiments, the at least one visible motion trail is colour-coded according to at least one of: its classification; its speed; and the classification-based compliance rules.

The method may further comprise, responsive to a selection of a particular one of the classified identified moving objects, replaying a subset of the video sequence showing that particular one of the classified identified moving objects. In certain particular embodiments, the method may further comprise indicating, in association with the subset of the video sequence showing that particular one of the classified identified moving objects, at least one of compliant and non-compliant behavior of that particular one of the classified identified moving objects. In certain embodiments, the selection specifies one of a time-based portion of the vector sequence for the particular one of the classified identified moving objects, the compliant portion of the vector sequence for the particular one of the classified identified moving objects and the non-compliant portion of the vector sequence for the particular one of the classified identified moving objects.

In some embodiments, a portion of the scene is excluded from classification.

BRIEF DESCRIPTION OF THE DRAWINGS

These and other features of the invention will become more apparent from the following description in which reference is made to the appended drawings wherein.

DETAILED DESCRIPTION

The present disclosure describes implementations of video surveillance of a scene, such as a warehouse or manufacturing facility, although it is not limited to such applications, and can be used in any scenario where motion can be assessed as compliant or non-compliant. Moving objects in the scene are tracked and assessed as compliant or non-compliant with certain predetermined protocols (e.g. a worker too close to a bladed machine, a vehicle in a pedestrian-only area, objects left on the floor), and the paths of the objects within the scene create motion trails that can be overlaid on a static image of the scene as part of a user interface. Optionally, the motion trails can be marked (e.g. different colours) as "compliant" or "non-compliant". By selecting one of the motion trails, a video of the object that corresponds to the motion trail can be displayed (e.g. as a pop-up window or "picture in picture"), optionally with annotations within the video.

Figure 1:
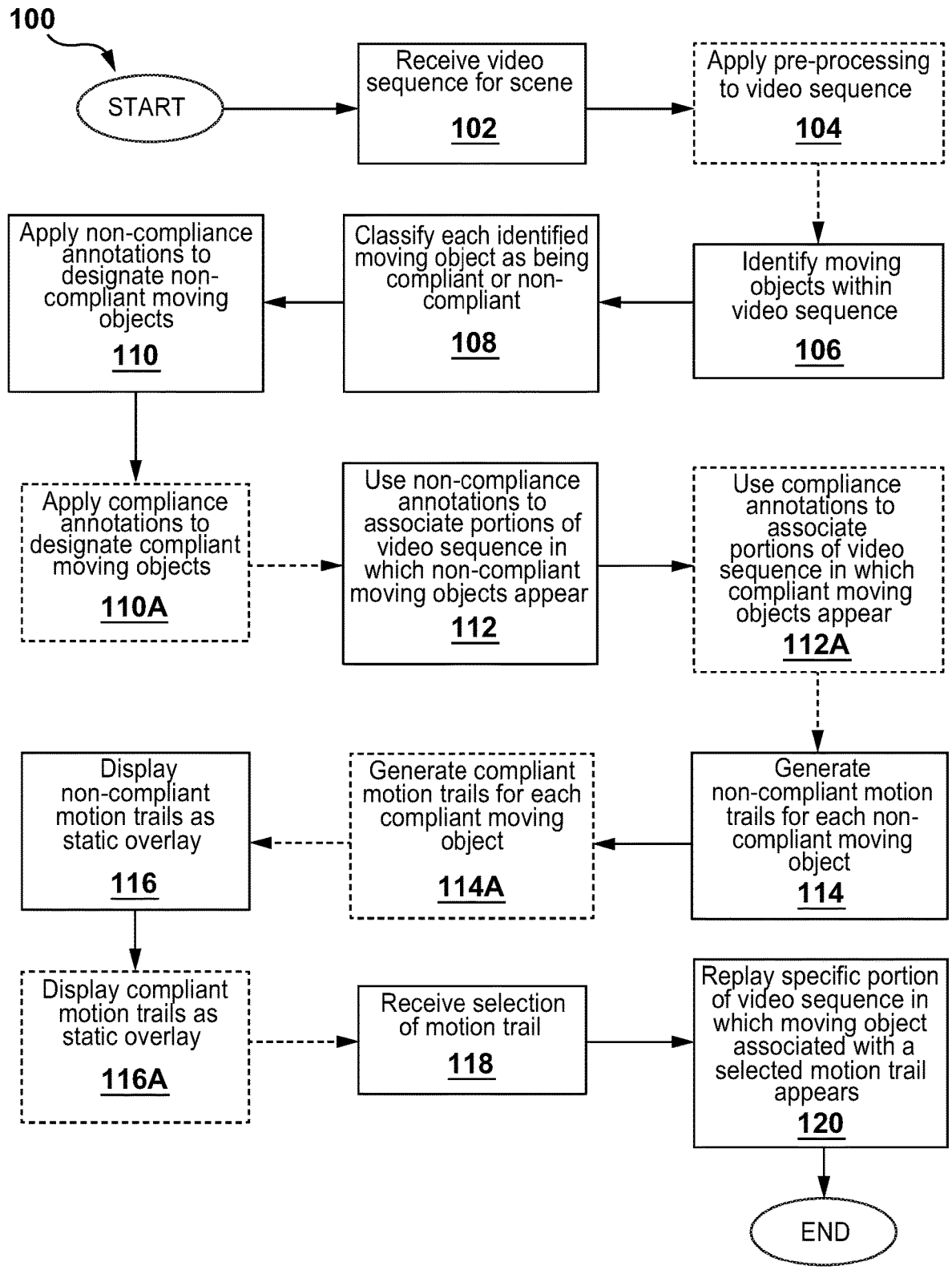
FIG. 1 is a flow chart showing, in overview, an illustrative method for generating compliance-annotated motion trails from a video sequence for a fixed scene.

Reference is now made to FIG. 1, which is a flow chart showing, in overview, an illustrative method 100 for generating compliance-annotated motion trails from a video sequence for a fixed scene. At step 102, the method 100 receives a video sequence for the scene. At optional step 104, pre-processing may be applied to the video sequence, and at step 106 the method 100 identifies moving objects within the video sequence. At step 108, the method 100 classifies each of the identified moving objects as being one of compliant moving objects and non-compliant moving objects, based on a set of rules. At step 110, the method 100 applies non-compliance annotations to designate the non-compliant moving objects as being non-compliant, and at step 112 the method 100 further uses the non-compliance annotations to associate those portions of the video sequence in which the non-compliant moving objects appear with respective ones of the non-compliant moving objects. An object may be designated as non-compliant if any part of its motion is non-compliant, i.e. violates a rule. At step 114, the method 100 generates non-compliant motion trails for the non-compliant moving objects. Each non-compliant motion trail is associated with a specific one of the non-compliant moving objects.

Optionally, the method 100 may also annotate and generate motion trails for compliant objects as well as non-compliant objects. Thus, at optional step 110A, the method 100 applies compliance annotations to designate the compliant moving objects as being compliant. An object may be designated as compliant if all of its motion is compliant (i.e. no rule violations). Step 110A may be implemented actively, e.g. by applying a specific annotation to designate an identified object as compliant, or passively (e.g. identified objects that are not annotated as non-compliant are deemed to be compliant). Equivalently, the process may be reversed, with compliant objects being actively annotated as such and objects that are not annotated as compliant being deemed to be non-compliant objects. At optional step 112A, the method 100 further uses the compliance annotations to associate those portions of the video sequence in which the compliant moving objects appear with respective ones of the compliant moving objects. Then, at optional step 114A, the method 100 generates compliant motion trails for the compliant moving objects, with each compliant motion trail being associated with a specific one of the compliant moving objects.

Once the non-compliant motion trails have been generated for the non-compliant moving objects (and if applicable, the compliant motion trails have been generated for the compliant moving objects), the method 100 has sufficient data to generate a user interface, some examples of which are shown in FIGS. 1A through 3B and 5 and described further below.

At step 116, the method 100 displays the non-compliant motion trails as a static overlay on the scene, and at optional step 116A, the method 100 also displays the compliant motion trails as part of the static overlay on the scene. Where both non-compliant motion trails and compliant motion trails are overlaid, the compliant motion trails may be visually distinguished from the non-compliant motion trails within the static overlay. For example, compliant motion trails may be shown in green and non-compliant motion trails may be shown in red, or in yellow, orange and red depending on severity. Alternatively, non-compliant motion trails may flash. The scene on which the motion trails is overlaid preferably shows only the background of the scene, without any of the moving objects captured by the video.

After step 116 (and optional step 116A if present), at step 118 the method 100 receives a selection of one of the motion trails. This may be a selection of a selected one of the non-compliant motion trails or, if steps 110A to 116A have been implemented, the selection may be a selection of a selected one of the compliant motion trails. The selection may be made, for example, by mousing over the selected trail and clicking or double-clicking, or by touching and holding a touch screen, among other methods. At step 120, responsive to the selection of a selected one of the motion trails, the method 100 replays the specific portion of the video sequence in which the moving object associated with the selected one of the motion trails appears. The replayed video may optionally include annotations.

FIGS. 1A through 3B and FIG. 5 show various embodiments of a user interface generated according to step 116 (and 116A if present) of the method 100.

Figure 1A:
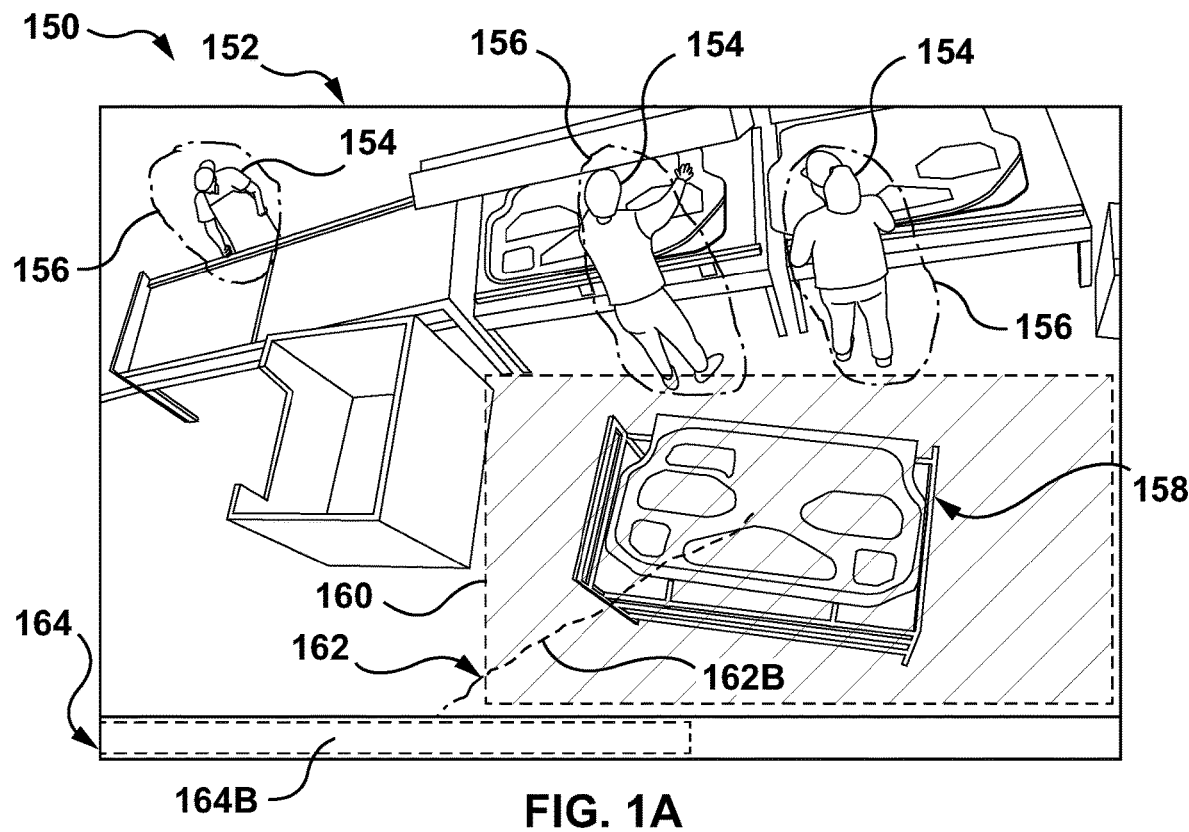
FIGS. 1A and 1B show presentations of a first embodiment of a user interface according to an implementation of the method of FIG. 1.
Figure 1B:
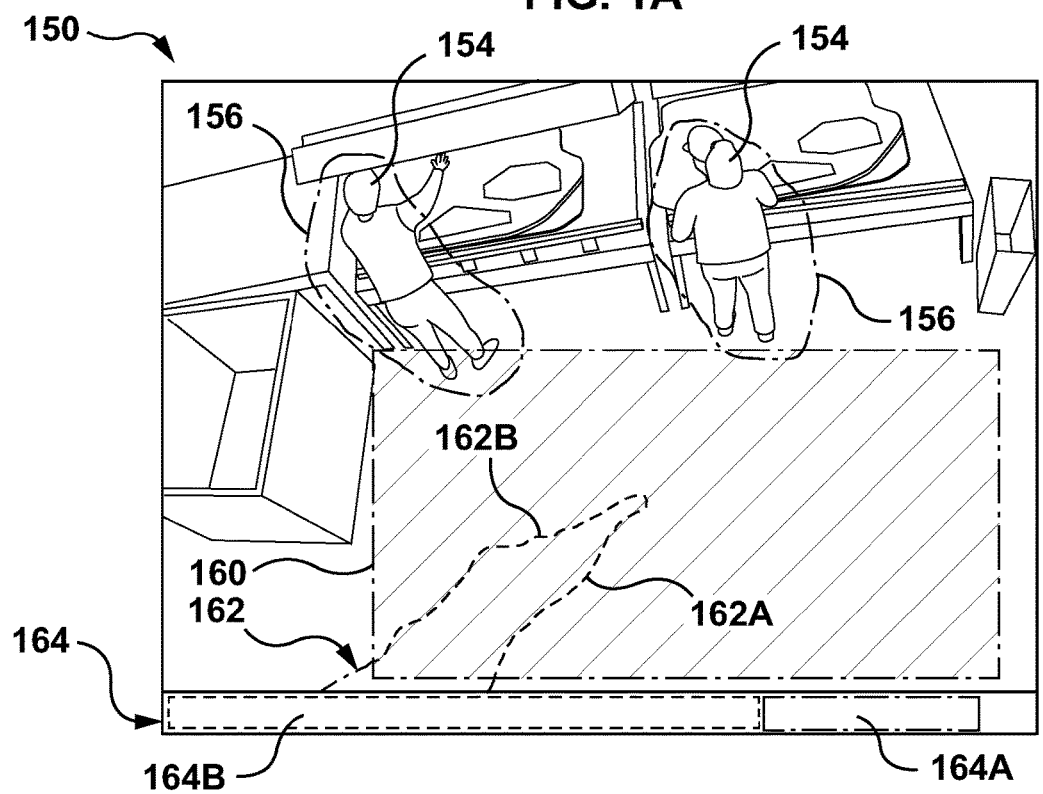

FIGS. 1A and 1B show presentations of a first embodiment of a user interface 150 according to an implementation of the method 100. As can be seen, the user interface includes a static representation 152 of the scene (e.g. a fixed image of the scene, such as a frame from the video sequence). At step 106 the method 100 identified moving objects within the video sequence. Human beings 154 were among the moving objects identified, and the human beings 154 are highlighted by encirclement 156. A stack of parts 158 (FIG. 1A) was also identified as a moving object. At step 108, the method 100 classified each of the identified moving objects as being one of compliant moving objects and non-compliant moving objects. In this case, the human beings 154 were classified as compliant, and in this embodiment no motion trails are displayed for the compliant objects. However, the stack of parts 158 was identified as non-compliant because it was left for too long in a "no idling" zone 160 which is annotated on the static representation 152, and therefore at step 116, the method 100 displays the non-compliant motion trail 162 as a static overlay on the scene. The non-compliant motion trail 162 comprises a compliant portion 162A of the motion trail 162 (where the stack of parts 158 is removed from the no idling zone) and a non-compliant portion 162B of the motion trail 162 (where the stack of parts 158 is brought into the no idling zone).

As can be seen in FIGS. 1A and 1B, the static overlay on the scene further comprises a timeline bar 164 corresponding to a timeline of the video sequence. The timeline bar 164 is located below the static representation 152 of the scene, and functions as a visual chronological menu.

In FIG. 1B, the timeline bar 164 displays both a compliant portion 164A of the timeline bar 164 and a non-compliant portion 164B of the timeline bar 164. The compliant portion(s) 164A of the timeline bar 164 represents the portion(s) of the timeline of the video sequence during which there were no non-compliant objects, and the non-compliant portion(s) 164B of the timeline bar 164 represents the portion(s) of the timeline of the video sequence during which there was at least one non-compliant object. Highlighting (e.g. by mousing over) a selected one of the non-compliant motion trails results in highlighting a portion of the timeline bar corresponding to the specific portion of the video sequence in which the non-compliant moving object associated with the highlighted one of the non-compliant motion trails appears. Alternatively or additionally, highlighting a portion of the timeline bar corresponding to the specific portion of the video sequence in which the non-compliant moving object appears results in highlighting the corresponding non-compliant motion trail(s). Thus, FIG. 1A shows the non-compliant portion 162B of the motion trail 162 and the non-compliant portion 164B of the timeline bar 164. A highlighted motion trail can be selected for replaying the video at step 118, for example by clicking or double-clicking a mouse, using a touch screen, or other methods.

Where the method 100 also annotates and generates motion trails for compliant objects as well as non-compliant objects, highlighting a selected one of the compliant motion trails preferably results in highlighting a portion of the timeline bar corresponding to the specific portion of the video sequence in which the compliant moving object associated with the highlighted one of the compliant motion trails appears, and vice versa. Thus, FIG. 1B shows both the compliant portion 162A and the non-compliant portion 162B of the motion trail 162 and shows both the compliant portion 164A and the non-compliant portion 164B of the timeline bar 164.

Figure 2A:
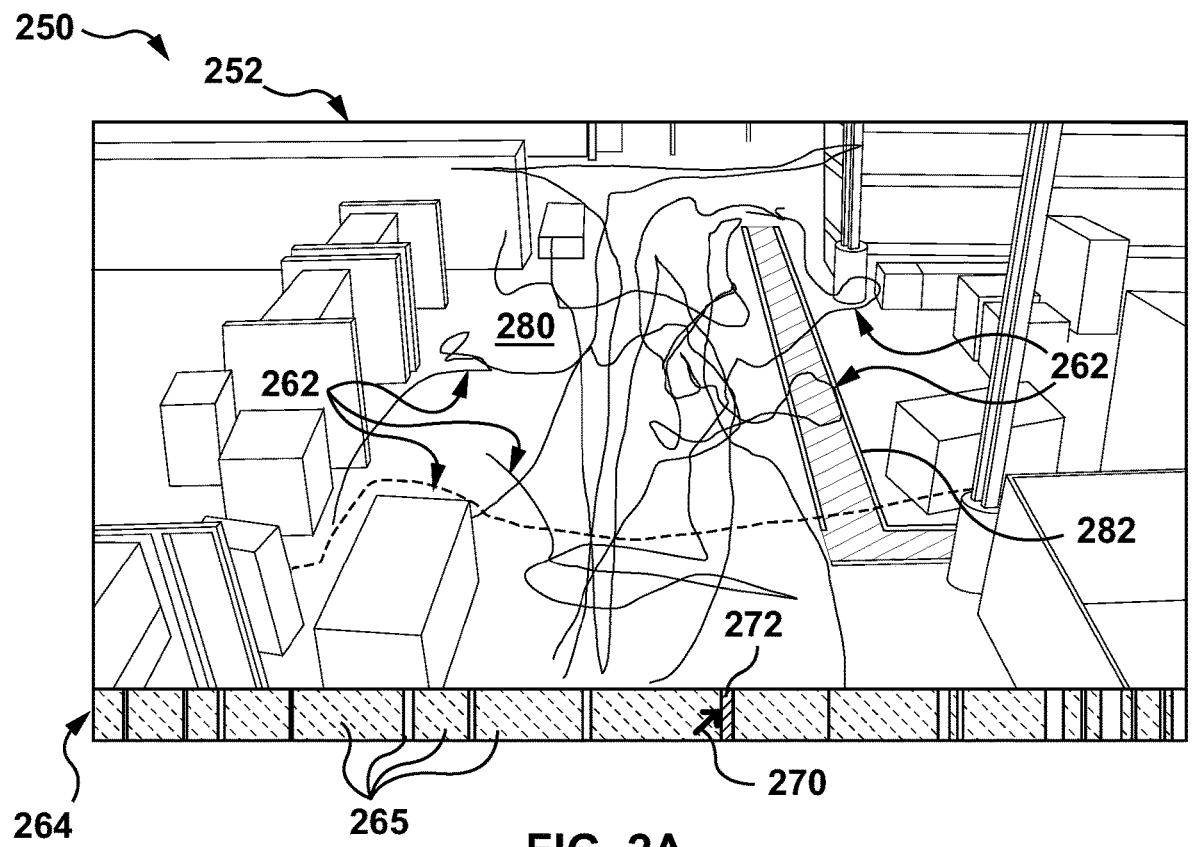
FIGS. 2A and 3A show presentations of a second embodiment of a user interface according to an implementation of the method of FIG. 1.
Figure 2B:
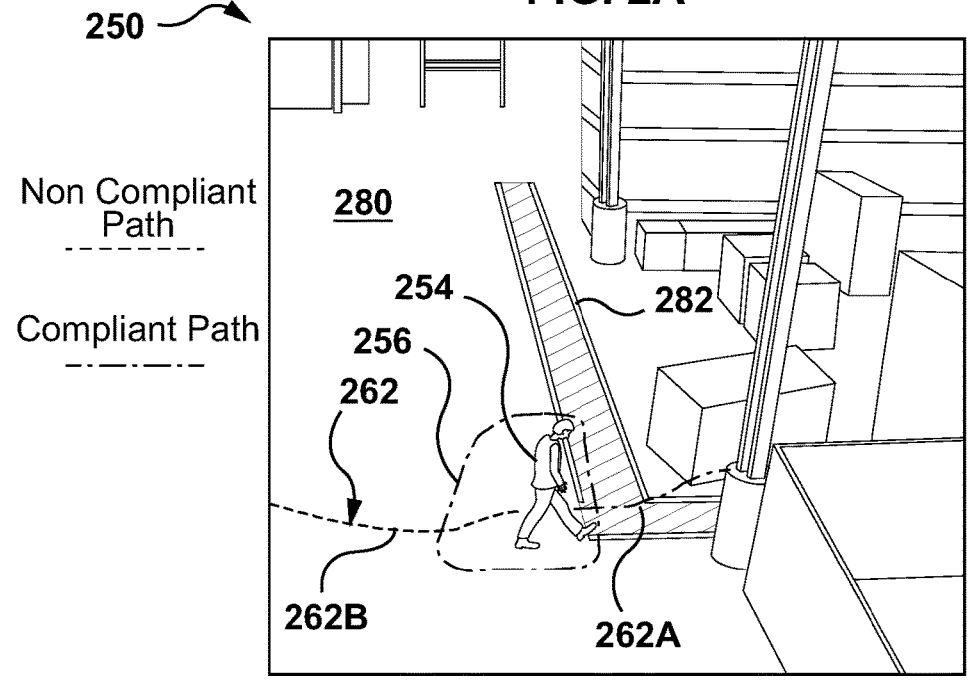
FIGS. 2B and 3B show replay of a specific portion of the video sequence in which a moving object associated with a motion trail selected in FIGS. 2A and 3A, respectively, appear.
Figure 3A:
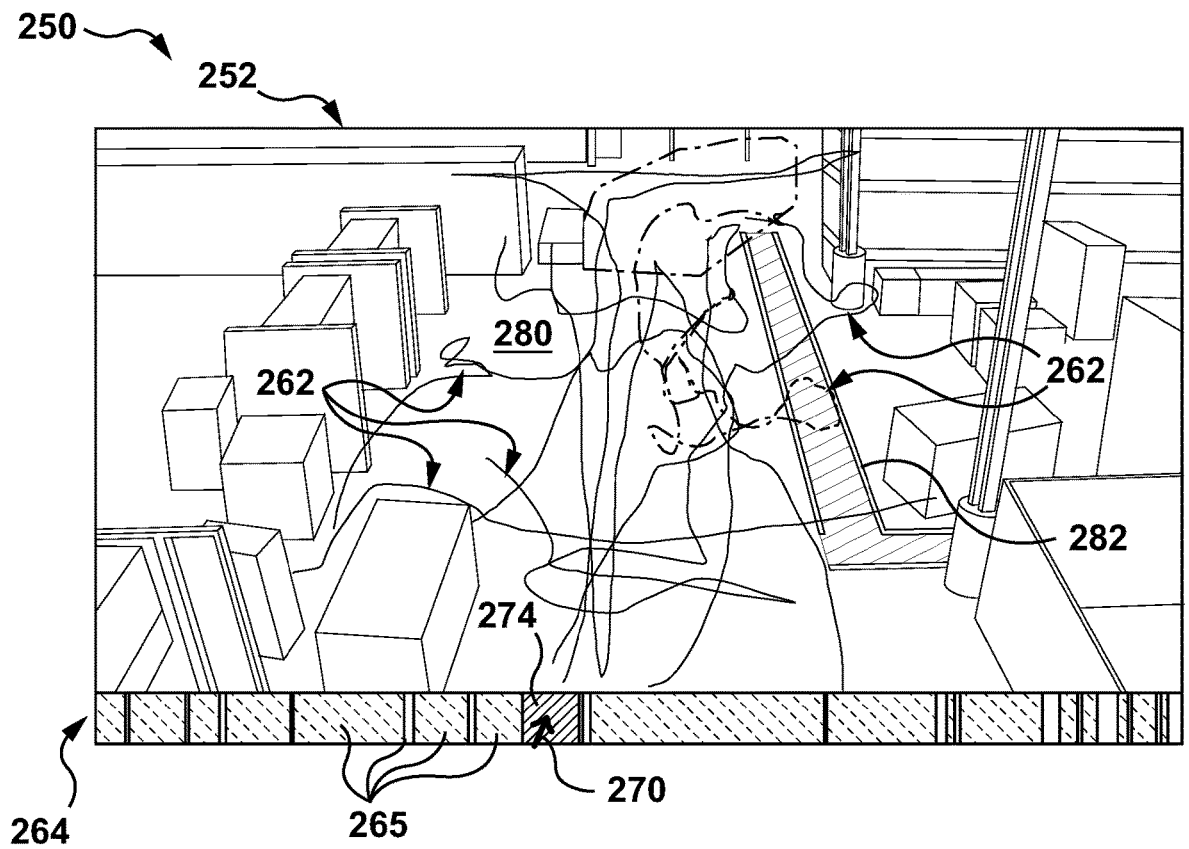

Reference is now made to FIGS. 2A and 3A, which show presentations of a second embodiment of a user interface 250 according to an implementation of the method 100. As can be seen, the user interface 250 includes a static representation 252 of the scene. At step 106 the method 100 identified moving objects within the video sequence, including a human being 254 (see FIG. 2B) and a forklift 266 (see FIG. 3B). At step 108, the method 100 classified each of the identified moving objects as being one of compliant moving objects and non-compliant moving objects. In this case, both the human being 254 and the forklift 266 were classified as non-compliant. In this embodiment both compliant and non-compliant motion trails 262 are displayed as a static overlay on the scene.

As was the case for the first embodiment, in the second embodiment shown in FIGS. 2A and 3A, the static overlay on the scene further comprises a timeline bar 264 corresponding to a timeline of the video sequence. In this case, however, instead of being divided into compliant and non-compliant portions, the timeline bar 264 is divided into portions, referred to as duration bars 265, corresponding to the individual motion trails 262. Every motion trail 262 has a start time and an end time that is indicated on the timeline bar 264. These start and end times are used to plot individual duration bars 265 within the timeline bar 264. The duration bars 265 help visualize the duration of the event represented by an individual motion trail 262 against the overall timeline of the video scene. The individual duration bar 265 (or grouped duration bars) can be visualized and selected (e.g. by mousing) to allow for a visualization that annotates the selected motion trail(s) 262. The corresponding motion trail(s) 262 are highlighted on the static representation 252 of the scene to ensure that the desired motion trail(s) 262 have been selected.

In FIG. 2A, the cursor 270 is positioned over a first specific portion 272 of the timeline bar 264, and the user interface 250 highlights the corresponding individual motion trail 262, as shown with a dashed line. In FIG. 3A, the cursor 270 is positioned over a second specific portion 274 of the timeline bar 264, and the user interface 250 highlights (shown with "dot-dash-dot" line) the corresponding individual motion trail 262, which is different from the individual motion trail 262 highlighted in FIG. 2A. By highlighting individual portions of the timeline bar 264 or by highlighting an individual motion trail 262, a corresponding annotated visualization is created.

Figure 3B:
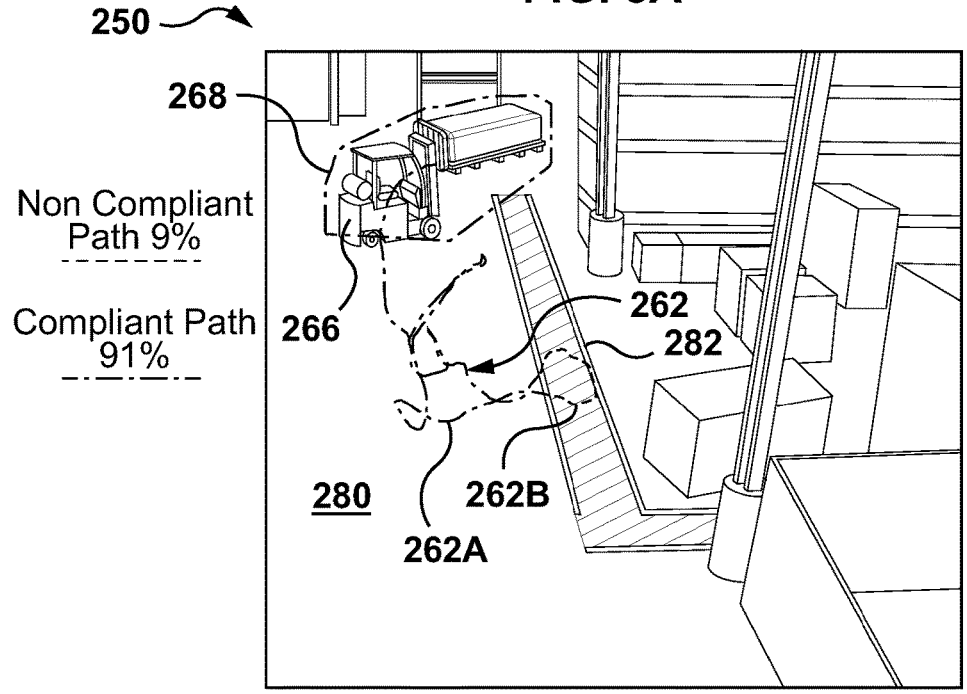

As noted above, at step 118 the method 100 receives a selection of one of the motion trails. With reference to FIGS. 2A and 3A, the selection may be, for example, by clicking or double-clicking a mouse while the cursor 270 is positioned over the first specific portion 272 of the timeline bar 264 or over the second specific portion 274 of the timeline bar 264. Then at step 120, responsive to the selection, the method 100 replays the specific portion of the video sequence in which the moving object associated with the selected one of the motion trails 262 appears. FIG. 2B shows replay of the specific portion of the video sequence in which the moving object associated with the motion trail 262 selected in FIG. 2A appears, and FIG. 3B shows replay of the specific portion of the video sequence in which the moving object associated with the motion trail 262 selected in FIG. 3A appears.

In FIG. 2B, the moving object associated with the motion trail 262 selected in FIG. 2A is a human being 254, and is highlighted by encirclement 256. Similarly, in FIG. 3B, the moving object associated with the motion trail 262 selected in FIG. 3A is a forklift 266 highlighted by encirclement 268. Both the human being 254 and the forklift 266 are non-compliant objects. Thus, in each case the non-compliant moving object (human being 254, the forklift 266) associated with the selected one of the non-compliant motion trails 262 is visually annotated (encirclement 256, 268) in the specific portion of the video sequence in which the non-compliant moving object associated with the selected one of the non-compliant motion trails 262 appear. The non-compliant motion trails 262 may themselves be annotated to distinguish compliant portions 262A from non-compliant portions 262B.

With reference specifically to FIG. 2B, the human being 254 is deemed to be non-compliant because the human being 254 has traversed a vehicle-only zone 280, as denoted by the non-compliant portion 262B (dashed line) of the motion trail 262. The compliant portion 262A (dot-dash-dot line) of the motion trail 262, where the human being 254 moves within a pedestrian-only zone 282, is also shown. Conversely, with reference to FIG. 3B, the forklift 266 is deemed to be non-compliant because the forklift 266 has crossed into pedestrian-only zone 282, denoted by the non-compliant portion 262B (dashed line) of the motion trail 262. The compliant portion 262A (dot-dash-dot line) of the motion trail 262, where the forklift 266 moves within vehicle-only zone 280, is also shown.

Figure 4:
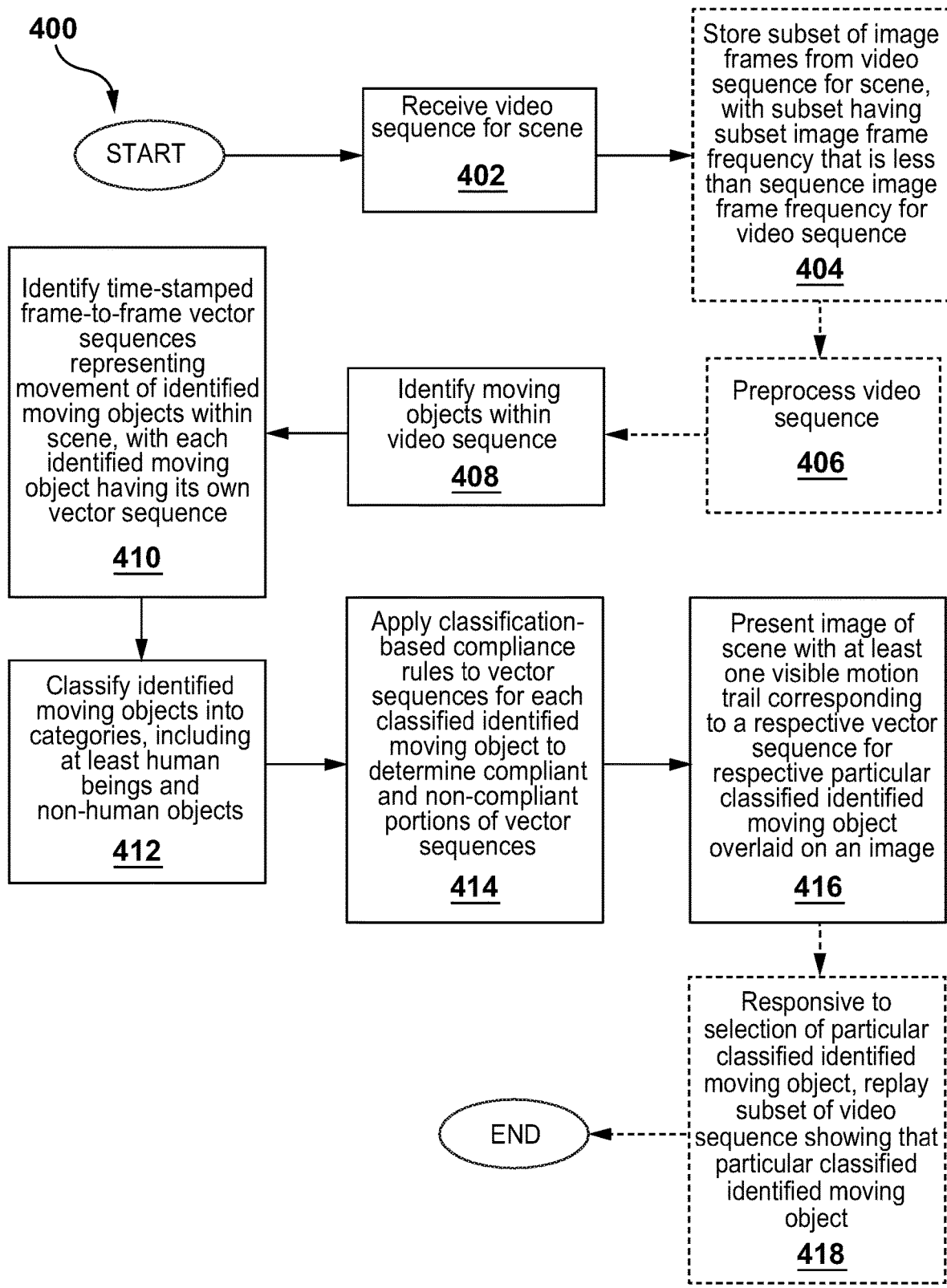
FIG. 4 is a flow chart showing an illustrative method for generating compliance-annotated motion trails for a scene.

Reference is now made to FIG. 4, which is a flow chart showing, in more detail, an illustrative method 400 for generating compliance-annotated motion trails for a scene. At step 402, the method 400 receives a video sequence for the scene. The video sequence comprises a series of image frames capturing the scene.

At optional step 404, the method 400 stores a subset of image frames from the video sequence for the scene, with the subset having a subset image frame frequency that is less than a sequence image frame frequency for the video sequence. For example, the method 400 may store every second image frame, every fifth image frame, every tenth image frame, or may use some other sampling protocol. Using a subset image frame frequency that is less than a sequence image frame frequency for the video sequence can reduce storage and processing requirements. It is to be understood that references to the video sequence and/or image frames will refer to the video sequence consisting of the subset of image frames where optional step 404 is present.

At optional step 406, the method 400 preprocesses the video sequence before proceeding to the next step. The preprocessing at optional step 406 may comprise applying image stabilization to the series of image frames to create a consistent scene, and then further optionally calibrating the consistent scene.

Applying image stabilization to the series of image frames may comprise identifying a common marker between image frames, tracking relative positions between the image frames to generate frame tracking information and then using the frame tracking information to adjust frame orientation for the series of images to correct for movement, angle and scale to create a consistent scene across the series of images. Identifying a common marker may comprise locating something in the image that can be consistently identified across many frames (for example, a window on a building). If the image is not stable, the marker (e.g. window) will be in a different position in each frame. Tracking relative positions between the image frames to generate frame tracking information may comprise noting the location of the marker (e.g. window) in each frame, and using the frame tracking information to adjust frame orientation for the series of images to correct for movement, angle and scale to create a consistent scene may comprise shifting each image in a sequence/video so that the marker (e.g. window) remains in the same location across every frame.

Calibrating the consistent scene may comprise mapping distorted reference frames in the series of images to a common image frame (e.g. to a common rectangle) and correcting image distortion within the common image frame to create a common viewpoint across the series of images. Mapping distorted reference frames in the series of images to a common image frame may comprise identifying a floor plane in the original image, which will typically be a skewed/uneven quadrilateral shape from the camera viewpoint, and mapping the skewed/uneven quadrilateral shape to a corrected rectangular shape. Correcting image distortion within the common image frame to create a common viewpoint may comprise vertical stretching of the image to correct for depth distortion.

It will be appreciated that while it is preferable to perform optional step 404 before optional step 406 so as to avoid applying pre-processing to image frames that will not be stored and analyzed, in some embodiments step 406 may be performed before step 404.

At step 408, the method 400 identifies moving objects within the video sequence. For example, code from OpenCV (Open Source Computer Vision), may be used in motion detection; this code, which is incorporated by reference herein, is available at https://docs.opencv.org/3.0-beta/modules/core/doc/operations_on_arrays.html#cv2.absdiff. Although this code is for subtraction rather than specifically for motion detection, it can be useful for estimating motion where certain assumptions about the video sequence hold true (e.g. that the lighting is consistent). Other examples of code that may be used, with appropriate adaptation, to identity moving objects include https://docs.opencv.org/3.0-beta/modules/imgproc/doc/motion_analysis_and_object_tracking.html?highlight=motion%20 tracking and https://docs.opencv.org/3.0-beta/modules/video/doc/motion_analysis_and_object_tracking.html?highlight=motion%20 tracking as well as the "tensorflow" code available at https://github.com/tensorflow/tensorflow/blob/master/tensorflow/python/training/tracking/tracking.py.

Next, after the moving objects are identified at step 408, at step 410 the method 400 identifies time-stamped frame-to-frame vector sequences representing movement of the identified moving objects within the scene. Each identified moving object has its own vector sequence. In one embodiment, identifying the time-stamped frame-to-frame vector sequences representing movement of the identified moving objects within the scene may be carried out by, for each identified moving object, assigning a unique identifier to that moving object and associating a time-series of movement vectors for that moving object with the unique identifier for that moving object. For example, motion metadata may be stored on an image-to-image basis, with the motion metadata indicating the relative motion between the geographic positions of an identified moving object in successive image frames. These small vectors can be used later in generating and visualizing motion trails, and in determining compliance. The identified moving object can have its movement vectors recorded in a raw frame-to-frame method and later "smoothed" for a more realistic visualization upon generating the visual motion trail result. The vector sequences may also be used to generate the timeline bars 164, 264 described above.

At step 412, the method 400 classifies the identified moving objects into categories. The categories into which the identified moving objects are classified include at least human beings and non-human objects, although preferably the classification of non-human objects is more granular. For example, the category of non-human objects may include two or more subcategories such as fixed machine with moving parts (e.g. a pick-and-place robot, welding robot, cutting robot, conveyor belt, bagging machine, injection molding machine, stamping press, tablet press, filling machine, bottling line, packaging line, rolling machine, slitting machine, baking line, compression molding, testing equipment, paint line, extruder, or any other production machines, etc.), vehicle (e.g. forklift, golf cart, autonomous vehicle/automated guide vehicle, tugger, car, bicycle, van, dump truck, excavator, mining shovel, loader, flatbed truck, tractor, tractor trailer, standing lift truck, powered industrial vehicle (PIV), powered pallet jacks, boom truck, scissor lift, etc.) and transported object (e.g. an object carried on a forklift, an object carried by a human being), and step 412 may classify the non-human objects into the subcategories. It is to be appreciated that a vehicle operated by a human operator would generally by classified as a non-human object, subject to combination-based rules a discussed below. In agricultural applications, the category of non-human objects may further include a category of livestock, such as, cows, horses, sheep, goats, mules, pigs and so forth. Furthermore, in specific applications certain types of animals may be classified as vehicles (e.g. horses may be categorized as vehicles at an equestrian facility). In some cases, some animals may be "vehicles" and others may be "livestock" and yet others may have further categories. For example, on a working farm or ranch horses may be "vehicles" while cattle, sheep and/or pigs may be "livestock" while dogs (e.g. herding dogs) may have a different category (neither vehicle nor livestock) subject to different rules. The listed subcategories of non-human objects are merely examples and are not intended to be limiting.

Classification can be accomplished using the determined pixel per second speed of the motion vector of an object by comparison to various benchmarks. For example, if the speed of an object is greater than a typical human speed, it can be classified as a vehicle. To further classify this same object, the size of the motion mass, when using background subtraction, can add to the classification determination for the same object. Thus, a moving object may be too massive to be a person and must be a vehicle. The aspect ratio of height and width of the motion object can be used to further improve the accuracy of a classification. If the aspect ratio is close to 1:1, then the object is likely not a person since a person is much taller than wide and would have an aspect ratio that would likely be 3:1. By combining multiple classification methods, the degree of confidence in a classification is improved. If these methods conflict as the motion object moves through the scene, a classification of "unkown" can be used. This allows for a human assisted method to properly classify the motion object visually by that end user of the system. Or, the unclassified objects can simply be removed from the reported data set. Note also that the "tensorflow" code available at https://github.com/tensorflow/tensorflow/blob/master/tensorflow/python/training/tracking/tracking.py described above in the context of identification of moving objects can also be used to for classification. It needs to be "taught" to learn what each classification of an object looks like and then tries to match pictures of learned objects to create a more exact match.

Optionally, a portion of the scene is excluded from classification. For example, where a scene includes a machine located behind a safety barrier, that portion of the scene may be excluded from classification even though the machine may be moving. Similarly, where the objects of concern are vehicles such as forklifts, physically non-drivable areas of the scene may be excluded from classification even though there may be other movement in the physically non-drivable areas. Likewise, where the objects of interest are human beings, portions of the scene that are inaccessible to humans may be excluded from classification. Portions of the scene to be excluded from classification may be set manually when configuring a computer system to implement the method 400. In one embodiment, a user can visually configure a polygon on a region of the image of the scene to define any relevant boundaries for regions to be excluded from classification.

At step 414, the method 400 applies classification-based compliance rules to the respective vector sequences for each of the classified identified moving objects to determine non-compliant portions of the vector sequences and compliant portions of the vector sequences. When the motion trails are ultimately generated, sections of the motion trails can be annotated differently depending on whether that portion of the motion trail is compliant or non-compliant. The severity of non-compliance can also be assessed, and the assessed severity may also be annotated. For example, compliance may be shown in green, a minor instance of non-compliance may be shown in yellow, a moderate instance of non-compliance may be shown in orange and a severe instance of non-compliance may be shown in red.

The term "classification-based compliance rules" is to be understood as meaning that different classes of object have different compliance rules. For example, human beings will typically have different compliance rules than other identified moving objects. Examples of classification-based compliance rules include, but are not limited to, boundary-based rules, speed-based rules, proximity-based rules, combination-based rules and sequence-based rules.

Examples of boundary-based rules include entry/exit to/from a predefined zone/boundary, or movement of particular object classes within a predefined zone/boundary, such as a vehicle entering a pedestrian-only zone or a human being entering a vehicle-only zone. This is one example where different classes of object may have different compliance rules, since some zones may be restricted to vehicles and others may be restricted to pedestrians such that a permitted action for a pedestrian human being is a prohibited action for a vehicle, and vice versa. In one illustrative implementation, a boundary defines a set of coordinates that are included in the boundary. When a vector has a value that matches this data set, then it would be determined as being within the boundary. The centroid and edges of the boundary are also stored. This allows for subtraction calculations to understand the distance from the motion vector position to the centroid to see how close the motion object is from the center of the boundary. The motion vector position can also be measured to the nearest boundary and produce a measurement of the distance within a boundary. Both methods can be used to generate metadata that indicates a severity of being located within a boundary (e.g. just brushing against a prohibited zone as compared to transgressing well into a prohibited zone). Severity of non-compliance with a boundary-based rule may be assessed, for example, based on how far beyond the boundary the object moved, or how long it stayed in a prohibited zone.

Boundaries may be set manually when configuring a computer system to implement the method 400. In one embodiment, a user can visually configure a polygon on a region of the image of the scene to define any relevant boundaries for boundary-based rules. Thus, there can be user-defined zones/boundaries, such as, for example, a pedestrian-only zone or a vehicle-only zone. If motion exists within a user-defined polygon zone, it may be deemed compliant or non-compliant depending on classification of the object. For example, consider a polygon that defines a pedestrian-only zone where the surrounding image is defined as a vehicle-only zone. Any motion by a human being within the polygon that defines the pedestrian-only zone would be deemed compliant, whereas any motion by the same motion object outside of the pedestrian-only zone would be deemed non-compliant. As will be explained further below, this can result in a more accurate characterization of the motion trail, with a portion of the motion trail marked as compliant and another portion of the motion trail marked as non-compliant, thus allowing the ability to report a ratio or score around the defined rule.

Other non-visual metadata parameters may be used to further define a rule with the prescribed polygon boundary. For example, speed can be used to determine compliance within the boundary, and speed metadata can further be used to define more than one threshold within that rule. Speed may be calculated, for example, by subtracting the previous position of an object in a frame from the position of the object in the subsequent frame. This provides a distance in pixels. The distance is then divided by the frame rate to result in a speed that is calculated in pixels per second. This speed can be used as a threshold in a relative sense. A reference motion object with a known speed can be used to convert from pixels per second to more familiar units like km/hr or mph. Conversion factors can be stored to convert from pixels per second to other units of speed measurement.

Examples of speed-based rules include an object moving too fast or too slow; these may be absolute rules or may operate in conjunction with boundary-based rules, e.g. there may be different speed-based rules for the same class of object depending on location. For example, a vehicle may be permitted to move more quickly in a "vehicle only" zone than in a "shared" zone traversed by both vehicles and human beings. An "idling" rule is another example of a speed-based rule (i.e. a speed of zero for longer than a predetermined period of time). Severity of non-compliance with a speed-based rule may be assessed, for example, by the magnitude (absolute or percentage) by which a speed limit was exceeded.

For idle motion objects, timing rules can be applied to determine if the motion vector of an idle object is within a small relative movement window (e.g. if any detected motion is merely an artifact of frame-to-frame image shift). If the motion object falls within a small motion window of itself, it is deemed to be idle. Every idle object also has a start time and end time which allows for the calculation of the overall event timing (duration of time that the object is idle). The duration of the small movement (idling) can be calculated and reported on using a predetermined compliance threshold. If the compliance threshold has been exceeded, it is deemed to be non-compliant. The duration of the idling can be used to determine severity of non-compliance. Zones/boundaries can be used to determine severity, or to differentiate zones with different tolerances on how long an object can be idle while remaining compliant. Using a minimum of one idle time value, a compliance threshold can be set, thus creating the ability to score compliance versus non-compliance. This object can also be annotated with the motion of the idle object entering and or exiting the video scene. Severity of non-compliance with an idling rule can be assessed, for example, by the duration of the idling.

Examples of proximity-based rules include a vehicle being too close to a human being, or two vehicles being too close together. This is another example where different classes of object may have different compliance rules, since there may be different proximity-based rules for different object classes. For example, the proximity-based rules may permit one human being to approach another human being much more closely than a vehicle (or specific subclass of vehicle) is permitted to approach a human being. Severity of non-compliance with a proximity-based rule may be assessed, for example, by using multiple distance thresholds for (e.g.) minor, moderate and severe non-compliance.

Combination-based rules generally relate to the combination of two or more objects into a macro-object (e.g. a forklift picking up a box, a box being placed onto a cart or trailer) or the separation of macro-objects into two or more objects (e.g. a forklift putting a box down, or a box being removed from a cart or trailer). For example, combination-based rules may permit a forklift to pick up or put down a box and permit a human being to mount or dismount the operator's seat on a forklift, but prohibit a human being from being lifted on the fork of a forklift. One illustrative method for determining that a combination has occurred involves the use of a defined proximity distance. Once motion objects are classified, two (or more) objects can be deemed to combine when they are within the defined proximity distance range from one another (i.e. when they are close enough together). When the end points of the motion vector of the two motion objects come within the proximity distance, they are deemed combined. The reverse is also true when two motion objects that are classified together, subsequently separate and begin to have independent and unique motion paths for two new classified motion objects, they can be deemed to be separated. Severity of non-compliance with a combination-based rule may be assessed, for example, by cumulating the number of impermissible combinations or separations.

Generally, sequence-based rules relate to the sequence in which events occur or the sequence in which task steps are performed. For example, a forklift or other vehicle may follow specific routes and may have to comply with specific delivery criteria. Similarly, human beings carrying out assembly operations may have to carry out the assembly steps in a specific order, or maintenance personnel may be required to follow specific repair steps in sequence. In safety applications, specific sequences may also be required. For example, in an application for safety surveillance of a firearms range, the unloading steps require a specific sequence to be effective (e.g. in a semiautomatic firearm the magazine should be removed before cycling the action to eject a cartridge from the chamber). Another example is process changeover, such as reconfiguring equipment to manufacture or assemble a different product; process changeover from one process to another process may have steps that need to match a predetermined standard. Sequence-based rules may also include a timing component ("timed sequence rules"). For example, human beings carrying out assembly operations may have to carry out the assembly steps in a specific order with each step being completed within a specified time, or quality assurance personnel may perform specific checks in a motion sequence with timing; cleaning of equipment may also follow predefined motion steps and timing. Severity of non-compliance with a sequence-based rule may be assessed, for example, by assigning severity scores based on importance of particular steps, or by cumulating the number of missed or out-of-sequence steps.

At step 416, the method 400 presents an image of the scene with at least one visible motion trail corresponding to a respective vector sequence for a respective particular one of the classified identified moving objects overlaid on the image. Optionally, one or more boundaries for boundary-based rules, or for regions that are to be excluded from classification, can be shown on the image of the scene. For example, FIGS. 1A and 1B show annotation of a "no idling" zone 160. Spline smoothing can be applied to the visible motion trail(s) to more accurately represent the motion of the object(s).

In some embodiments, visible motion trails are overlaid on the image for all of the classified identified moving objects. In other embodiments, visible motion trails are overlaid on the image for a subset of the classified identified moving objects. Filtering of the motion trails and idle objects can reduce the number of visible motion trails and/or idle objects presented to make it easier to find good examples of compliant and/or non-compliant moving objects. Selecting speed, duration, total motion trail length and many other metadata parameters allows for a set of filters to refine the targeted compliant and/or non-compliant moving objects to be discovered, examined and/or validated. Statistics can also be collected from historical data and added to the visualization to show trends, counts and scores relating to a set of filtered motion or idle results. These statistics can also be embedded into the published video result along with the annotated motion or idle objects.

Step 416 may present visible motion trails for the respective vector sequences for respective particular ones of a plurality of the classified identified moving objects overlaid on the image. In such an embodiment, the plurality of the classified identified moving objects may be, for example, all of the classified identified moving objects, all of the compliant classified identified moving objects, all of the non-compliant classified identified moving objects, all of the compliant classified identified moving objects of one specific category or subcategory (e.g. all compliant vehicles) or all of the non-compliant classified identified moving objects of one specific category or subcategory (e.g. all non-compliant human beings).

In some embodiments, presenting an image of the scene with at least one visible motion trail corresponding to a respective vector sequence for a respective particular one of the classified identified moving objects overlaid on the image at step 416 is in response to a selection. For example, in FIG. 1A, a selection is performed by highlighting the non-compliant portion 164B of the timeline bar 164, which results in display of the non-compliant portion 162B of the motion trail 162.

The visible motion trail(s) presented at step 416 may represent the non-compliant portion of the vector sequence, the compliant portion of the vector sequence, the complete vector sequence, a portion of the vector sequence corresponding to a defined (predefined or dynamically defined) time period or an arbitrary portion of the vector sequence. For example, in FIG. 1A the non-compliant portion 162B of the motion trail 162 is displayed, whereas in FIG. 1B the entire motion trail 162 is displayed. Similarly, in FIGS. 2A and 3A the entirety of each of the motion trails 262 is displayed.

The visible motion trail corresponding to a respective vector sequence for a respective particular one of the classified identified moving objects that is classified as an idle object may comprise a static indication of the idle object. For example, in FIG. 1A the stack of parts 158 is idle, and an image of the stack of parts 158 is presented as a static indication of the idle object. While FIG. 1A shows the static indication of the idle object as one of an image of the idle object, this is merely illustrative and other indications of an idle object may be used, such as, for example and without limitation, a heat map or a fixed marking.

Color may be used as one type of annotation method in the visualization step 416. For example, the visible motion trail(s) may colour-coded according to any one or more of classification, speed and the classification-based compliance rules.

At optional step 418, responsive to a selection of a particular one of the classified identified moving objects, the method 400 replays a subset of the video sequence showing that particular one of the classified identified moving objects. The selection may specify, for example, a time-based portion of the vector sequence for the particular classified identified moving object, the compliant portion of the vector sequence for the particular classified identified moving object, the non-compliant portion of the vector sequence for the particular classified identified moving object, or the entire vector sequence for the particular classified identified moving object.

For example, FIG. 2B shows replay of the specific portion of the video sequence in which the moving object (human being 254) associated with the motion trail 262 selected in FIG. 2A appears, and FIG. 3B shows replay of the specific portion of the video sequence in which the moving object (forklift 268) associated with the motion trail 262 selected in FIG. 3A appears. Step 418 may further comprise indicating, in association with the subset of the video sequence showing that particular one of the classified identified moving objects, at least one of compliant and non-compliant behavior of that particular one of the classified identified moving objects. For example, in FIGS. 2B and 3B showing the video replay, both the compliant portion 262A (dot-dash-dot line) and the non-compliant portion 262B (dashed line) of the motion trail 262 are shown. The percentages of the motion trails 262 that were compliant and non-compliant may also be presented, as shown in FIGS. 2B and 3B.

Optionally, instead of replaying a subset of the video sequence showing the particular classified identified moving object, step 418 may present a representative static image showing the particular classified identified moving object. Also, the replay may be cropped and/or enlarged relative to the original video sequence.

Figure 5:
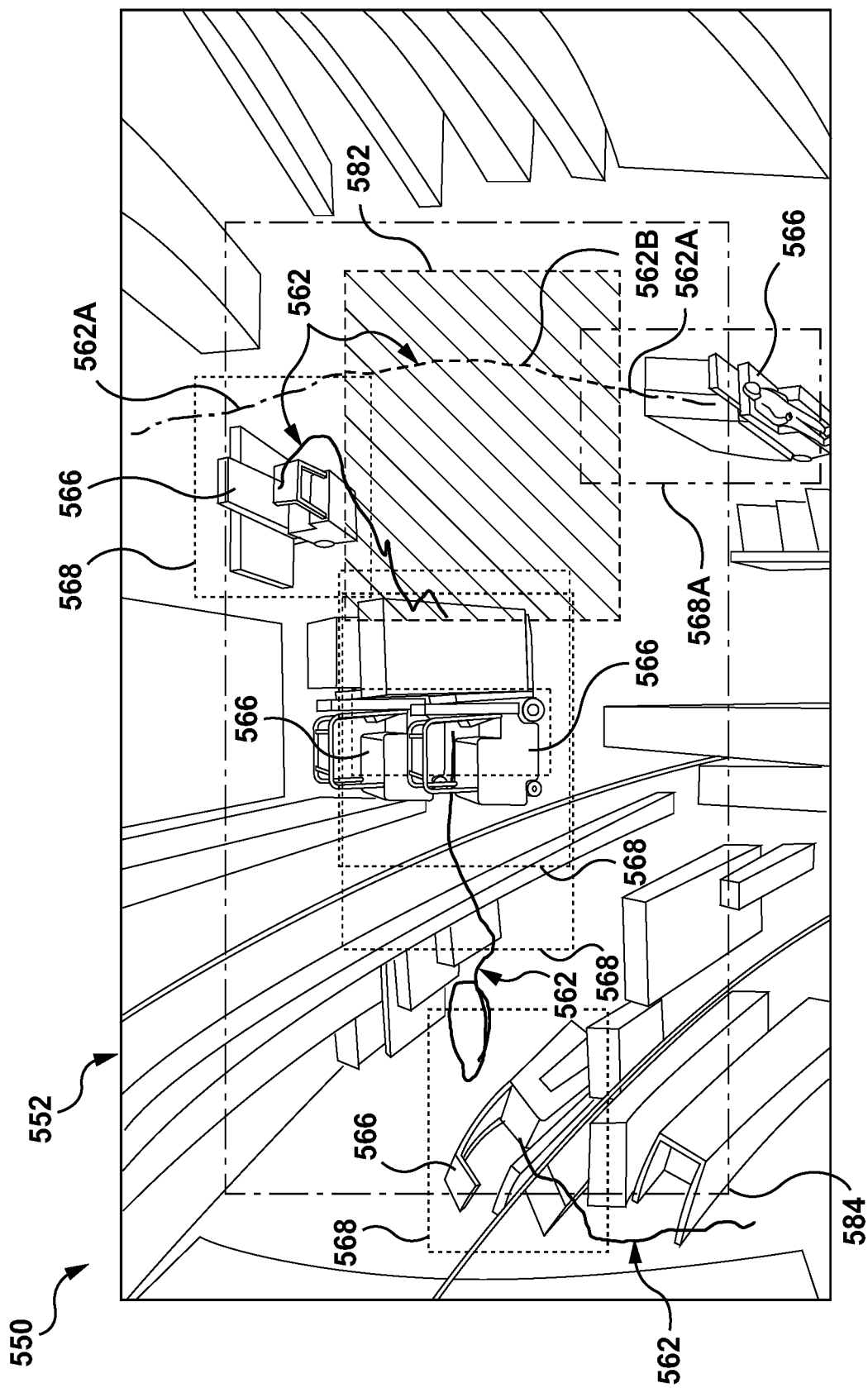
FIG. 5 shows a third embodiment of a user interface.

Reference is now made to FIG. 5, which shows a third embodiment of a user interface 550 which includes a static representation 552 of the scene, in which a number of moving objects, in this case forklifts 566, have been identified and are highlighted by encirclement 568, 568A. Motion trails 562 for the forklifts 566 are also displayed as a static overlay on the static representation 552 of the scene. One of the forklifts 566 has been highlighted, as denoted by the dash-double-dot-dash encirclement 568A. This particular forklift 566 is deemed to be non-compliant because the forklift 566 has crossed into a pedestrian-only zone 582, denoted by the non-compliant portion 562B (dashed line) of the motion trail 562. The compliant portions 562A (dot-dash-dot line) of the motion trail 562, where the forklift 566 moves within a zone where vehicles are permitted, are also shown. It is also noted that two of the forklifts 566 are very close together such that their respective encirclements 568 overlap; depending on the proximity-based rules (if any) these forklifts 566 may also be deemed to be non-compliant.

As noted above, in some embodiments, some regions of the scene may be excluded from classification and boundaries for the regions that are to be excluded from classification can be shown on the image of the scene. The third illustrative user interface 550 in FIG. 5 includes a classification exclusion boundary 584 overlaid on the static representation 552 of the scene. As can be seen from the motion trails 562, motion is tracked outside of the classification exclusion boundary 584; however, classification of moving objects as either compliant or non-compliant is performed only inside the classification exclusion boundary 584.

Additionally, as noted above the visible motion trail(s) presented at step 416 may represent a portion of the vector sequence corresponding to a defined time period. It can be seen in FIG. 5 that there are five forklifts 566 but only four visible motion trails 562. If there are more moving objects than visible motion trails, it typically means that the moving objects without a visible motion trail are idle during the reporting period. In FIG. 5, the uppermost forklift 566 in the center of the Figure was idle during the defined time period and therefore does not have an associated motion trail. Idle times may be presented in a different aspect of the user interface; FIG. 1A is an example of a user interface 150 that shows idling.

While the figures and examples have denoted specific industrial applications such as warehouses, assembly lines, and the like, these are merely illustrative examples and are not intended to be limiting. Aspects of the present disclosure can be applied in virtually any video surveillance context in which moving objects can be classified as compliant or non-compliant with certain rules.

Notably, reference has been made to receiving a video sequence for a scene, with the video sequence comprising a series of image frames capturing the scene. While aspects of the present disclosure can be applied in the context of multiple cameras or other imaging devices, in particularly preferred embodiments the video sequence is from a single, fixed camera or other imaging device (not from multiple cameras). For those embodiments, the use of a single, fixed camera should be understood as being critical.

As can be seen from the above description, the methods for generating compliance-annotated motion trails in a video sequence from a fixed scene described herein represent significantly more than merely using categories to organize, store and transmit information and organizing information through mathematical correlations. The methods for generating compliance-annotated motion trails in a video sequence from a fixed scene are in fact an improvement to the technology of automated computer-driven analytics for video surveillance, as these provide enhanced interface tools for a human reviewer to select and examine the behaviour of specific moving objects identified by automated processes. As such, the methods for generating compliance-annotated motion trails in a video sequence from a fixed scene are confined to automated computer-driven video surveillance analytics.

The present disclosure may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

It will be understood that the present invention can be implemented by computer readable program instructions. Computer readable program instructions described herein can be downloaded to respective computing/processing devices from a computer readable storage medium or to an external computer or external storage device via a network. Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

These computer readable program instructions may be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
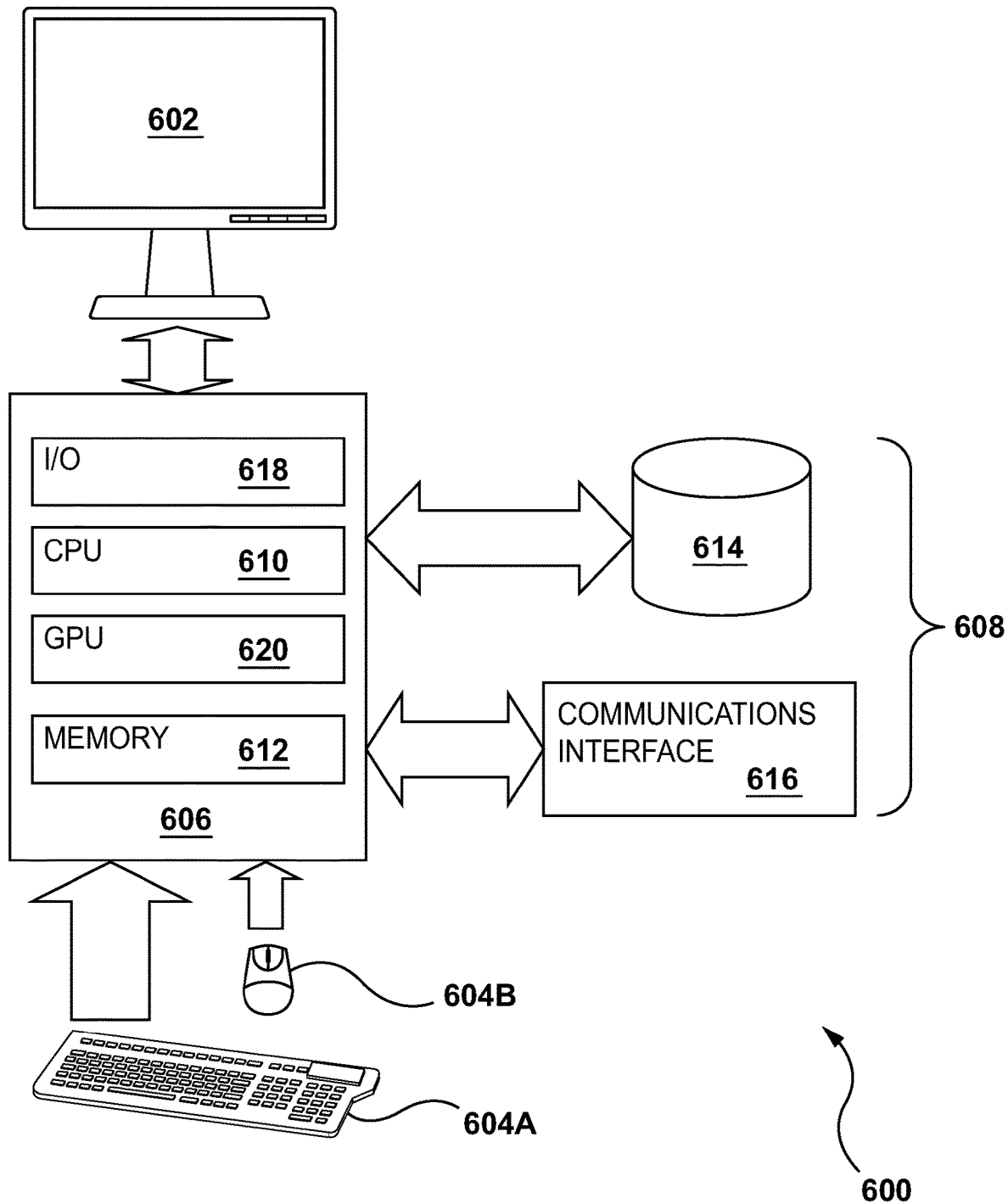
FIG. 6 illustrates an exemplary computer system in respect of which aspects of the present technology may be implemented.

An illustrative computer system in respect of which aspects of the technology herein described may be implemented is presented as a block diagram in FIG. 6. The illustrative computer system is denoted generally by reference numeral 600 and includes a display 602, input devices in the form of keyboard 604A and pointing device 604B, computer 606 and external devices 608. While pointing device 604B is depicted as a mouse, it will be appreciated that other types of pointing device, or a touch screen, may also be used.

The computer 606 may contain one or more processors or microprocessors, such as a central processing unit (CPU) 610. The CPU 610 performs arithmetic calculations and control functions to execute software stored in an internal memory 612, preferably random access memory (RAM) and/or read only memory (ROM), and possibly additional memory 614. The additional memory 614 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 614 may be physically internal to the computer 606, or external as shown in FIG. 6, or both.

The computer system 600 may also include other similar means for allowing computer programs or other instructions to be loaded. Such means can include, for example, a communications interface 616 which allows software and data to be transferred between the computer system 600 and external systems and networks. Examples of communications interface 616 can include a modem, a network interface such as an Ethernet card, a wireless communication interface, or a serial or parallel communications port. Software and data transferred via communications interface 616 are in the form of signals which can be electronic, acoustic, electromagnetic, optical or other signals capable of being received by communications interface 616. Multiple interfaces, of course, can be provided on a single computer system 600.

Input and output to and from the computer 606 is administered by the input/output (I/O) interface 618. This I/O interface 618 administers control of the display 602, keyboard 604A, external devices 608 and other such components of the computer system 600. The computer 606 also includes a graphical processing unit (GPU) 620. The latter may also be used for computational purposes as an adjunct to, or instead of, the CPU 610, for mathematical calculations.

The various components of the computer system 600 are coupled to one another either directly or by coupling to suitable buses.

The terms "computer system", "data processing system" and related terms, as used herein, are not limited to any particular type of computer system and encompasses servers, desktop computers, laptop computers, networked mobile wireless telecommunication computing devices such as smartphones, tablet computers, as well as other types of computer systems.

Thus, computer readable program code for implementing aspects of the technology described herein may be contained or stored in the memory 612 of the computer 606, or on a computer usable or computer readable medium external to the computer 606, or on any combination thereof.

While certain open source software packages have been described as useful in implementing certain aspects of the present invention, it is to be understood that the present invention, as claimed, is directed not to any single step which may be known in the art, but to an inventive combination of steps producing the novel and useful result of generating compliance-annotated motion trails in a video sequence from a fixed scene.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the scope of the appended claims. For example, it is to be understood that the present technology contemplates that, to the extent possible, one or more features of any implementation can be combined with one or more features of any other implementation. In construing the claims, it is to be understood that computer-implementation of the present technology is essential.

Certain illustrative embodiments have been described by way of example. It will be apparent to persons skilled in the art that a number of variations and modifications can be made without departing from the scope of the claims.

What is claimed is:

1. A method for generating compliance-annotated motion trails in a video sequence from a fixed scene, the method comprising:
    receiving a video sequence for the scene;
    identifying moving objects within the video sequence;
    classifying the identified moving objects as being one of compliant moving objects and non-compliant moving objects;
    applying non-compliance annotations to designate the non-compliant moving objects as being non-compliant;
    further using the non-compliance annotations to associate those portions of the video sequence in which the non-compliant moving objects appear with respective ones of the non-compliant moving objects;
    generating non-compliant motion trails for the non-compliant moving objects, wherein each non-compliant motion trail is associated with a specific one of the non-compliant moving objects;
    displaying the non-compliant motion trails as a static overlay on the scene;
    receiving a selection of a selected one of the non-compliant motion trails; and
    responsive to the selection of a selected one of the non-compliant motion trails, replaying the specific portion of the video sequence in which the non-compliant moving object associated with the selected one of the non-compliant motion trails appears.

2. The method of claim 1, further comprising:
    applying compliance annotations to designate the compliant moving objects as being compliant;
    further using the compliance annotations to associate those portions of the video sequence in which the compliant moving objects appear with respective ones of the compliant moving objects;
    generating compliant motion trails for the compliant moving objects, wherein each compliant motion trail is associated with a specific one of the compliant moving objects;
    displaying the compliant motion trails as part of the static overlay on the scene, wherein the compliant motion trails are visually distinguished from the non-compliant motion trails within the static overlay;
    receiving a selection of a selected one of the compliant motion trails; and
    responsive to the selection of a selected one of the compliant motion trails, replaying the specific portion of the video sequence in which the compliant moving object associated with the selected one of the compliant motion trails appears.

3. The method of claim 1, wherein:
    the static overlay further comprises a timeline bar corresponding to a timeline of the video sequence; and
    highlighting a selected one of the non-compliant motion trails results in highlighting a portion of the timeline bar corresponding to the specific portion of the video sequence in which the non-compliant moving object associated with the highlighted one of the non-compliant motion trails appears.

4. The method of claim 2, wherein:
the static overlay further comprises a timeline bar corresponding to a timeline of the video sequence;
highlighting a selected one of the non-compliant motion trails results in highlighting a portion of the timeline bar corresponding to the specific portion of the video sequence in which the non-compliant moving object associated with the highlighted one of the non-compliant motion trails appears; and
highlighting a selected one of the compliant motion trails results in highlighting a portion of the timeline bar corresponding to the specific portion of the video sequence in which the compliant moving object associated with the highlighted one of the compliant motion trails appears.

5. The method of claim 1, wherein the non-compliant moving object associated with the selected one of the non-compliant motion trails is visually annotated in the specific portion of the video sequence in which the non-compliant moving object associated with the selected one of the non-compliant motion trails appear.

6. A computer program product comprising a tangible computer-readable medium embodying instructions which, when executed by a data processing system, cause the data processing system to carry out a method for generating compliance-annotated motion trails in a video sequence from a fixed scene, the method comprising:
receiving a video sequence for the scene;
identifying moving objects within the video sequence;
classifying the identified moving objects as being one of compliant moving objects and non-compliant moving objects;
applying non-compliance annotations to designate the non-compliant moving objects as being non-compliant;
further using the non-compliance annotations to associate those portions of the video sequence in which the non-compliant moving objects appear with respective ones of the non-compliant moving objects;
generating non-compliant motion trails for the non-compliant moving objects, wherein each non-compliant motion trail is associated with a specific one of the non-compliant moving objects;
displaying the non-compliant motion trails as a static overlay on the scene;
receiving a selection of a selected one of the non-compliant motion trails; and
responsive to the selection of a selected one of the non-compliant motion trails, replaying the specific portion of the video sequence in which the non-compliant moving object associated with the selected one of the non-compliant motion trails appears.

7. The computer program product of claim 6, wherein the method further comprises:
applying compliance annotations to designate the compliant moving objects as being compliant;
further using the compliance annotations to associate those portions of the video sequence in which the compliant moving objects appear with respective ones of the compliant moving objects;
generating compliant motion trails for the compliant moving objects, wherein each compliant motion trail is associated with a specific one of the compliant moving objects;
displaying the compliant motion trails as part of the static overlay on the scene, wherein the compliant motion trails are visually distinguished from the non-compliant motion trails within the static overlay;
receiving a selection of a selected one of the compliant motion trails; and
responsive to the selection of a selected one of the compliant motion trails, replaying the specific portion of the video sequence in which the compliant moving object associated with the selected one of the compliant motion trails appears.

8. The computer program product of claim 6, wherein:
the static overlay further comprises a timeline bar corresponding to a timeline of the video sequence; and
highlighting a selected one of the non-compliant motion trails results in highlighting a portion of the timeline bar corresponding to the specific portion of the video sequence in which the non-compliant moving object associated with the highlighted one of the non-compliant motion trails appears.

9. The computer program product of claim 7, wherein:
the static overlay further comprises a timeline bar corresponding to a timeline of the video sequence;
highlighting a selected one of the non-compliant motion trails results in highlighting a portion of the timeline bar corresponding to the specific portion of the video sequence in which the non-compliant moving object associated with the highlighted one of the non-compliant motion trails appears; and
highlighting a selected one of the compliant motion trails results in highlighting a portion of the timeline bar corresponding to the specific portion of the video sequence in which the compliant moving object associated with the highlighted one of the compliant motion trails appears.

10. The computer program product of claim 6, wherein the non-compliant moving object associated with the selected one of the non-compliant motion trails is visually annotated in the specific portion of the video sequence in which the non-compliant moving object associated with the selected one of the non-compliant motion trails appear.

11. A data processing system comprising memory and at least one processor, wherein the memory contains instructions which, when executed by the at least one processor, cause the at least one processor to carry out a method for generating compliance-annotated motion trails in a video sequence from a fixed scene, the method comprising:
receiving a video sequence for the scene;
identifying moving objects within the video sequence;
classifying the identified moving objects as being one of compliant moving objects and non-compliant moving objects;
applying non-compliance annotations to designate the non-compliant moving objects as being non-compliant;
further using the non-compliance annotations to associate those portions of the video sequence in which the non-compliant moving objects appear with respective ones of the non-compliant moving objects;
generating non-compliant motion trails for the non-compliant moving objects, wherein each non-compliant motion trail is associated with a specific one of the non-compliant moving objects;
displaying the non-compliant motion trails as a static overlay on the scene;
receiving a selection of a selected one of the non-compliant motion trails; and
responsive to the selection of a selected one of the non-compliant motion trails, replaying the specific portion of the video sequence in which the non-compliant moving object associated with the selected one of the non-compliant motion trails appears.

12. The data processing system of claim 11, wherein the method further comprises:
- applying compliance annotations to designate the compliant moving objects as being compliant;
- further using the compliance annotations to associate those portions of the video sequence in which the compliant moving objects appear with respective ones of the compliant moving objects;
- generating compliant motion trails for the compliant moving objects, wherein each compliant motion trail is associated with a specific one of the compliant moving objects;
- displaying the compliant motion trails as part of the static overlay on the scene, wherein the compliant motion trails are visually distinguished from the non-compliant motion trails within the static overlay;
- receiving a selection of a selected one of the compliant motion trails; and
- responsive to the selection of a selected one of the compliant motion trails, replaying the specific portion of the video sequence in which the compliant moving object associated with the selected one of the compliant motion trails appears.

13. The data processing system of claim 11, wherein:
the static overlay further comprises a timeline bar corresponding to a timeline of the video sequence; and
highlighting a selected one of the non-compliant motion trails results in highlighting a portion of the timeline bar corresponding to the specific portion of the video sequence in which the non-compliant moving object associated with the highlighted one of the non-compliant motion trails appears.

14. The data processing system of claim 12, wherein:
the static overlay further comprises a timeline bar corresponding to a timeline of the video sequence;
highlighting a selected one of the non-compliant motion trails results in highlighting a portion of the timeline bar corresponding to the specific portion of the video sequence in which the non-compliant moving object associated with the highlighted one of the non-compliant motion trails appears; and
highlighting a selected one of the compliant motion trails results in highlighting a portion of the timeline bar corresponding to the specific portion of the video sequence in which the compliant moving object associated with the highlighted one of the compliant motion trails appears.

15. The data processing system of claim 11, wherein the non-compliant moving object associated with the selected one of the non-compliant motion trails is visually annotated in the specific portion of the video sequence in which the non-compliant moving object associated with the selected one of the non-compliant motion trails appear.

* * * * *